United States Patent [19]
Wagenhals

[11] 3,925,968
[45] Dec. 16, 1975

[54] POWER LAWN MOWER AND MULCHER-BAGGER COMBINATION

[75] Inventor: Fred William Wagenhals, Marion, Ohio

[73] Assignee: Deere & Company, Moline, Ill.

[22] Filed: Mar. 4, 1974

[21] Appl. No.: 447,842

[52] U.S. Cl. .................. 56/13.3; 56/16.6; 56/503
[51] Int. Cl.² ......................................... A01D 49/00
[58] Field of Search ........................ 56/12.8–13.4, 56/503, 16.6, 14.5

[56] References Cited
UNITED STATES PATENTS

| | | | |
|---|---|---|---|
| 2,843,991 | 7/1958 | Poehls .................................. | 56/13.3 |
| 3,090,188 | 5/1963 | Gorham ............................... | 56/503 |
| 3,657,865 | 4/1972 | Ober ..................................... | 56/13.3 |
| 3,688,479 | 9/1972 | Martinson et al. ................... | 56/13.2 |

*Primary Examiner*—J. N. Eskovitz

[57] ABSTRACT

A rotary lawn mower is supported at the underside of and between the front and rear wheels of a tractor and includes a mower blade housing which directs cut material through a discharge opening in the side of the housing. Supported on the mower housing is a rotary mulcher comprising a generally cylindrical housing in which a plurality of mulcher-impeller blades are mounted for rotation about a generally horizontal axis extending centrally through the housing. The mulcher includes baffle plates which extend into the discharge opening of the mower housing for guiding cut material to an inlet opening in the lower portion of the mulcher housing. The mulcher-impeller blades are disposed for engaging this material and carrying it around to an outlet opening located on a path tangent to the path taken by the blades. A plurality of cutter bars are fixed in the housing and have portions which cooperate with the mulcher-impeller blades to cut the material carried by the blades into relatively small bits before it is discharged through the outlet opening. A tubular conduit is connected to the outlet opening and extends through a removable top of a container which is supported on the tractor. A plastic bag or liner is removably received in the container so that it may be removed when it becomes full of material.

3 Claims, 5 Drawing Figures

POWER LAWN MOWER AND MULCHER-BAGGER COMBINATION

BACKGROUND OF THE INVENTION

The present invention relates to a tractor-mounted lawn care device and more particularly relates to such a device which severs grass and transfers the same to a container carried by or connected to the tractor.

One lawn care device of the general type described in the immediately above paragraph is disclosed in U.S. Pat. No. 3,657,865 granted on Apr. 25, 1972, to Howard C. Ober. The lawn care device disclosed in the patent is a riding type rotary lawn mower having blades housed such that they operate to cut grass, pick up leaves and to mulch or shred the grass clippings and leaves and then to discharge the shredded material into a blower housing which acts in turn to discharge the shredded material into a receptacle supported on the mower chassis. One problem attendent with devices of this type is that under some conditions shredding of the clippings will result in such a quantity of moisture being released that the clippings stick to and pack against the sides of the housings, thus impeding the mower's ability to transfer clippings to the blower resulting in either total blockage of the flow of material to the blower or at least resulting in an inefficient flow of material through the blower resulting in the material being returned to the ground.

Further, it has been found that the shredding of grass clippings and leaves, or the like, by a mower blade is usually not sufficient to eliminate the need of frequent emptying of the receptacle which receives the material.

SUMMARY OF THE INVENTION

According to the present invention, there is provided a tractor mounted lawn care device of a type capable of cutting grass and efficiently transferring the grass clippings and any leaves, or the like, through which the device passes, to a container carried by or connected to the tractor.

It is an object of the invention to provide a rotary lawn mower and mulcher combination wherein the mower discharges directly into the mulcher and the mulcher includes mulcher-impeller blades which carry the material past and cooperate with cutterbars for mulching the material and which impel the material through a discharge chute to a container.

A more specific object is to provide a mulcher, as described in the immediately preceding paragraph, wherein the mulcher-impeller blades are relatively flat and have impeller fins secured thereto.

These and other objects will become apparent from a reading of the following description in conjunction with the appended drawings.

DESCRIPTION OF THE PREFERRED EMBODIMENT

Figure 1:
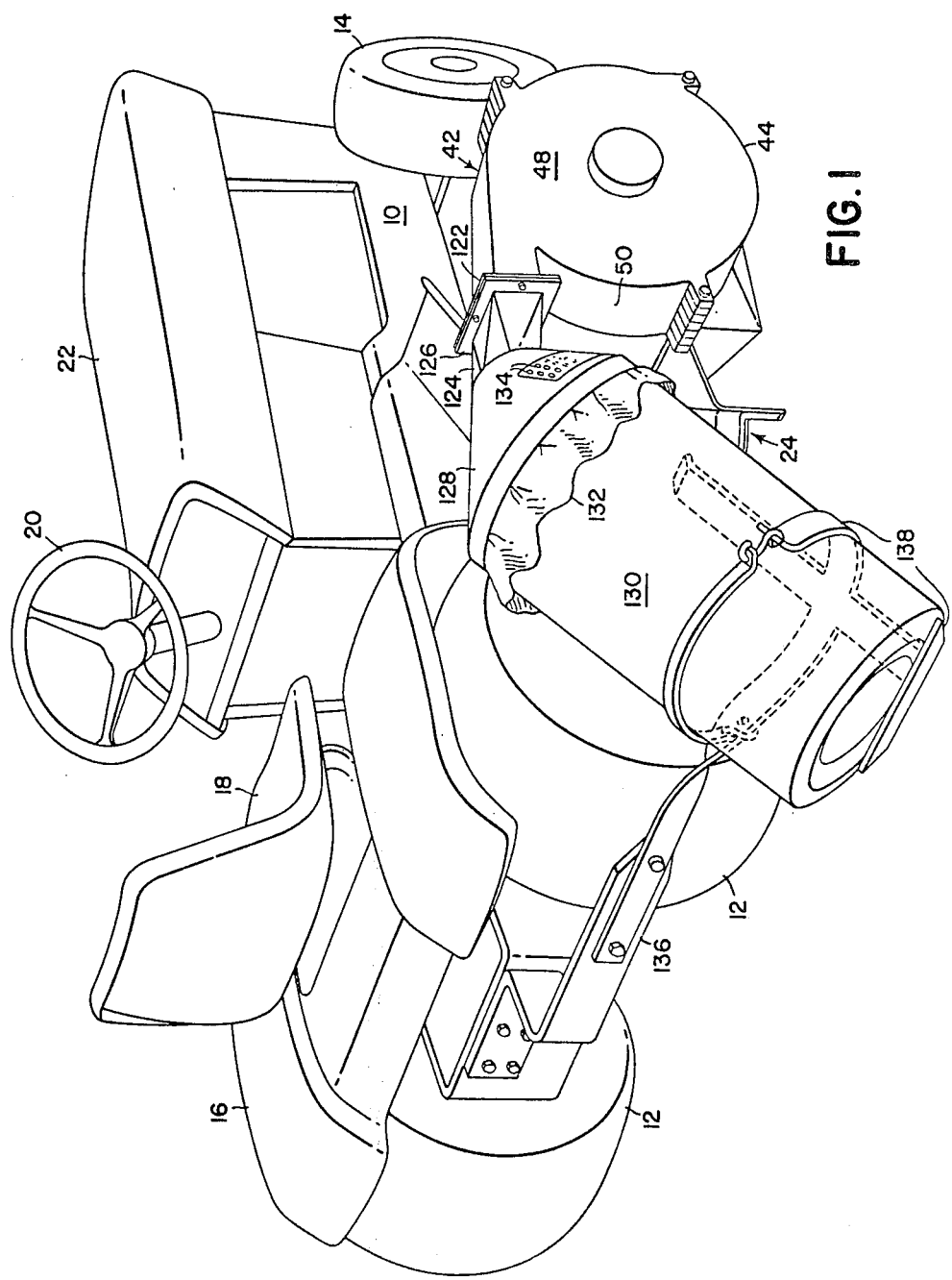
FIG. 1 is a perspective view taken from the rear right side of a tractor-mounted lawn care device embodying the principals of the present invention.

The mulcher-bagger attachment for leaves and grass clippings is shown in association with a combination lawn and garden tractor and mower. The lawn and garden tractor has a main frame 10 mounted on a pair of rear drive wheels 12 and steerable front wheels 14, as is conventional. The main frame 10 includes a generally horizontal rear deck structure 16, which overlies the transmission and other conventional drive components, the outer rear portions of the deck overlying the rear wheels 12 and functioning as fenders. Mounted on top of the deck 16 over the rear axle is an operator's seat 18, which is rearwardly of a steering wheel assembly 20 positioned for being grasped by an operator seated in the seat. As is conventional, the tractor has an internal combustion engine (not shown) mounted within the usual engine enclosure 22.

Figure 4:
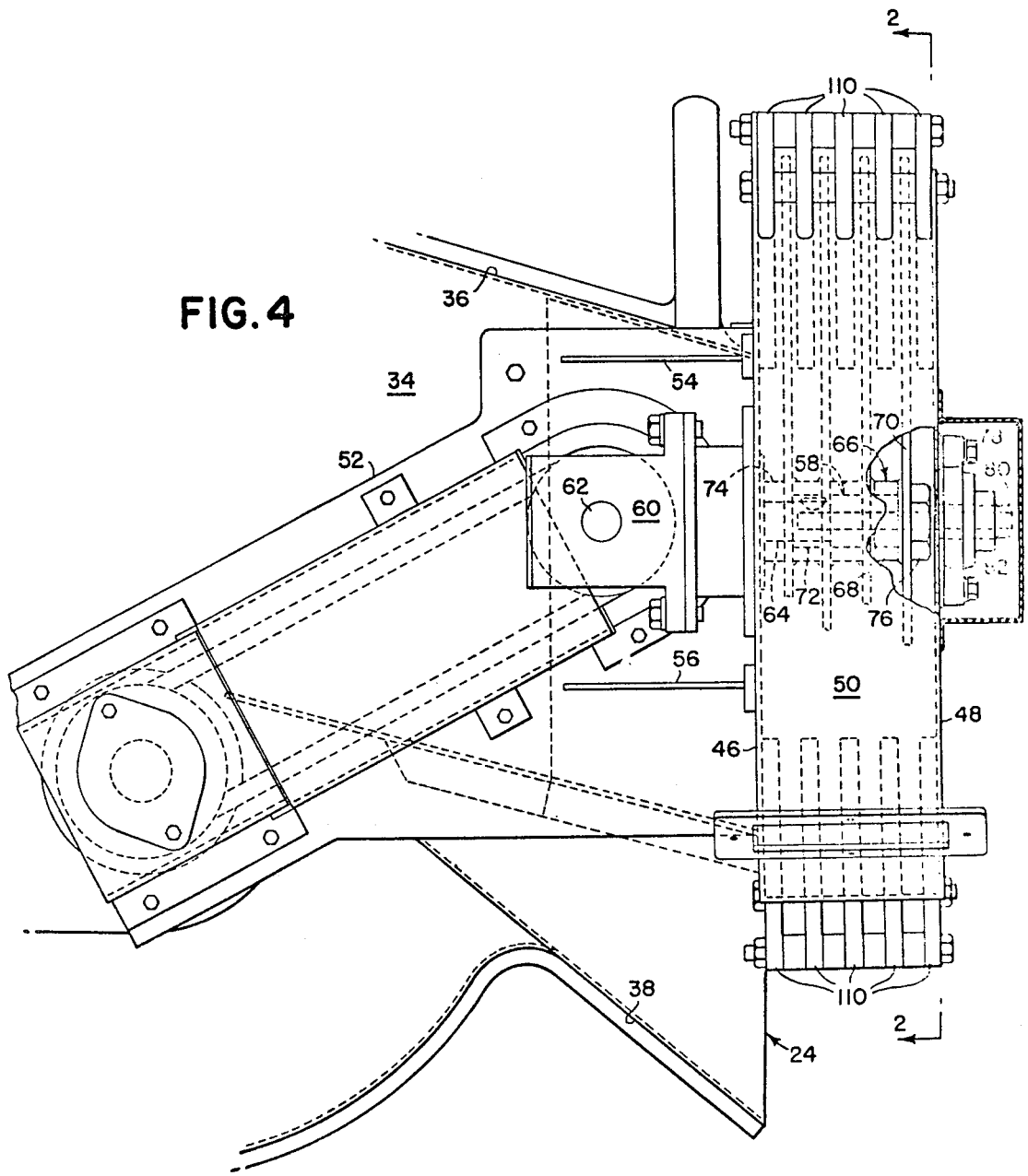
FIG. 4 is a top plan view of the mulcher and mower housing combination shown in FIG. 3.

A rotary mower, indicated in its entirety by the numeral 24, is suspended from the tractor main frame 10 between the rear and front wheels 12 and 14. The mower is of well-known construction and includes a generally horizontal housing or mower deck 26 having an open bottom. Three rotary blades 28 are respectively mounted on vertical shafts 30 journaled in the housing, only the right-hand blade 28 and shaft 30 being shown in the drawing, since the construction of such mowers is well known, the middle blade being spaced slightly ahead of the outer blades to provide a small degree of overlap between the adjacent blades. Each blade 28 rotates in a clockwise direction as seen in FIG. 4, the blades being driven from the engine via a conventional belt drive, partially shown at 31. As the machine advances, the rotating blades sever the grass and discharge the grass clippings tangentially to the right through a discharge chute which extends from the right side of the mower deck 26 and is formed by a generally horizontal top wall 34 and generally vertical front and rear walls 36 and 38, respectively, the outer edges of the walls cooperating to form a discharge opening 40. As is well known, the rotating blades are formed to provide suction so that they will pick up material such as leaves and impell them, together with the grass clippings, through the discharge chute, the lift due to the rotating blades causing the material to generally flow along the underside of the top of the mower deck.

Mounted on the mower deck 26 for receiving material from the discharge opening 40 is a mulcher-bagger attachment 42. The attachment 42 includes a generally cylindrical housing 44 having parallel vertically disposed inner and outer walls 46 and 48, respectively, which are interconnected at their respective peripheries by an intermediate wall 50. The housing 44 is supported on the mower deck 26 through means of a generally horizontal mounting plate 52 which overlies and is bolted to the top wall 34 of the discharge chute 32 and is secured at its outer end to the inner wall 46 of the housing 44 through means of front and rear upstanding gussets 54 and 56, respectively, having lower ends welded or otherwise secured to the mounting plate 52 and having respective upright mounting portions disposed against and welded or otherwise fastened to the inner wall 46. Fixed to the housing wall 46 between the gussets 54 and 56 is a gearbox 60 of a conventional type including input and output shafts 62 and 64, respectively, arranged at right angles to each other and interconnected by gearing (not shown) for transferring rotary motion of the shaft 62 to the shaft 64. The shaft 64 projects horizontally and centrally through the inner housing wall 46.

Mounted for rotation with the output shaft 64 is a rotor 66 comprising a hollow cylindrical hub 68 to which a set of four flat metal blades 70 are welded. The blades 70 extend diametrically of the housing 44 and are equispaced from each other axially along the hub 68 and preferably are angularly spaced and fixed in positions 45° from one another.

For the purpose of mounting the rotor 66 on the shaft 64, a sleeve 72 is keyed to the shaft 64 and extends through the rotor 66, the sleeve having a reference shoulder 74 disposed between the inner end of the rotor and the inner wall 46 of the housing. The rotor 66 is held against the reference shoulder 74 through means of a nut 76 which is threaded on a reduced-in-diameter portion of the sleeve 72. A further reduced-in-diameter portion of the sleeve extends through a bearing assembly 78 which is fixed to the outer housing wall 48. For the purpose of holding the reference shoulder 74 of the sleeve 72 against the inner wall 46 of the housing, a screw 80 extends axially into the sleeve 72 and carries a washer 82 which bears against the outer end of the sleeve 72. A belt pulley 84 is mounted on the bottom end of the input shaft 62 of the gearbox 60 and a drive belt 86 drivingly connects the pulley 84 with a similar pulley 88 mounted on an upwardly extending portion of the vertical shaft 30 to which the outer mower blade 28 is fixed. The upper portion of the shaft 30 is supported in upper and lower bearings 90 and 92, respectively, which are respectively mounted on a generally horizontal portion 94 of a drive guard 96 and on an outer end portion of the mounting plate 52.

The housing 44 of the mulcher-bagger attachment 42 is mounted such that a lower portion thereof is closely adjacent the mower discharge opening 40. For the purpose of permitting material to enter the housing, an inlet opening 98 is located in the lower portion of the inner wall 46 of the housing 44. Material is guided from the mower discharge chute to the inlet opening 98 of the housing 44 through means of a baffle or deflector member 100 having a bottom wall 102 which inclines downwardly and inwardly from a lower edge of the opening 98 to a position beneath the top wall 34 of the discharge chute and at a level approximately the same as the bottom of the mower deck 26. Integral with the bottom wall 102 is a front upright wall 104 which extends into the discharge chute 34 alongside the front wall 36 thereof and to which it is secured through means of appropriate fasteners. Also integral with the baffle member 100 is a rear upright wall 106 which extends into the mower discharge chute in general parallelism to the wall 104 and having the purpose of preventing material from being recirculated through the mower deck 26. A generally horizontal flange 108 is integral with a portion of the upper edge of the rear wall 106 and underlies the discharge chute top wall 34 and is connected thereto through suitable fasteners.

Figures 2, 5:
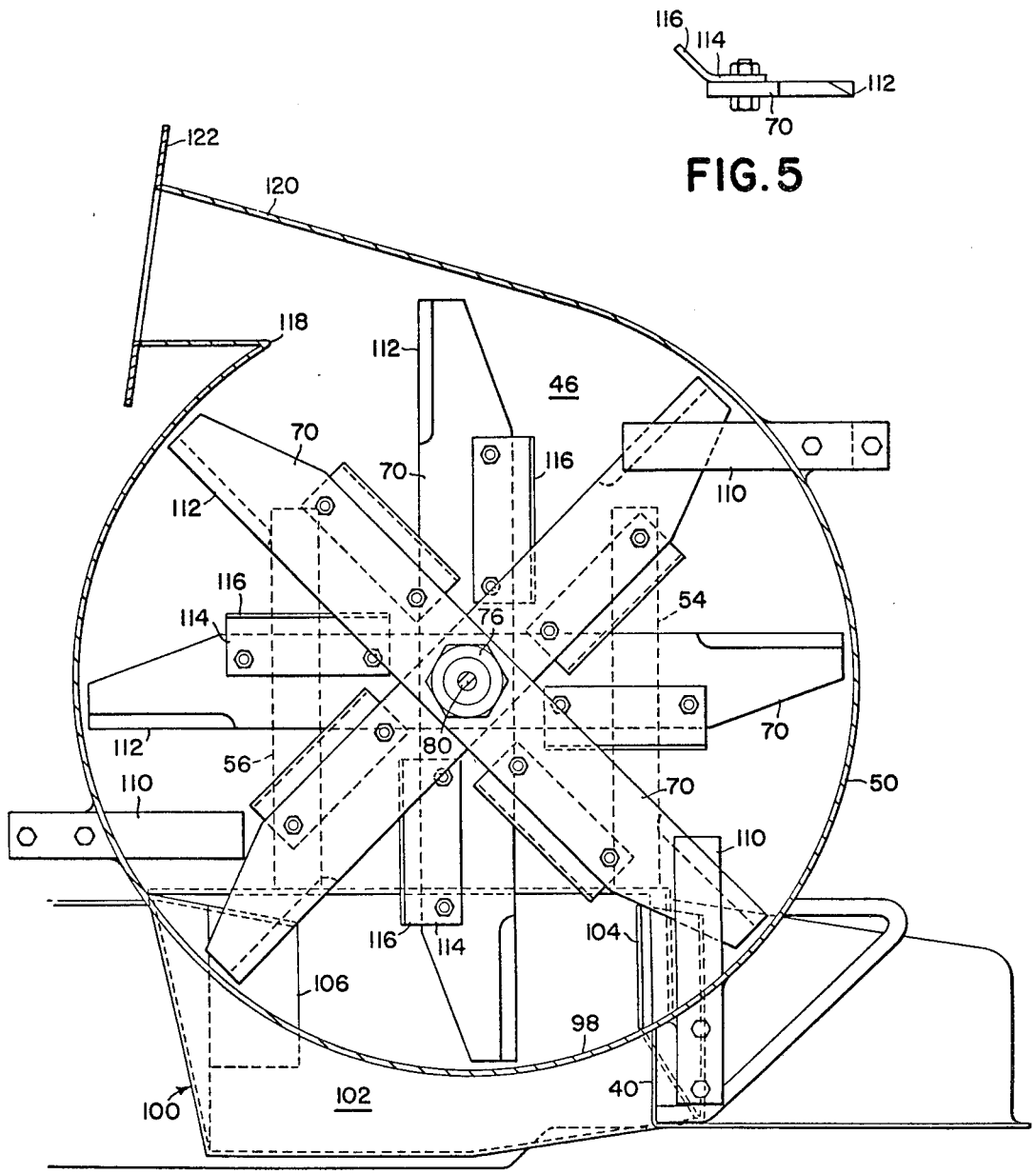
FIG. 2 is a sectional view taken along line 2—2 of FIG. 4 showing the mulcher and the mower housing with portions being broken away to expose parts thereof.
FIG. 5 is an end view of one end of one of the mulcher-impeller blades.
Figure 3:
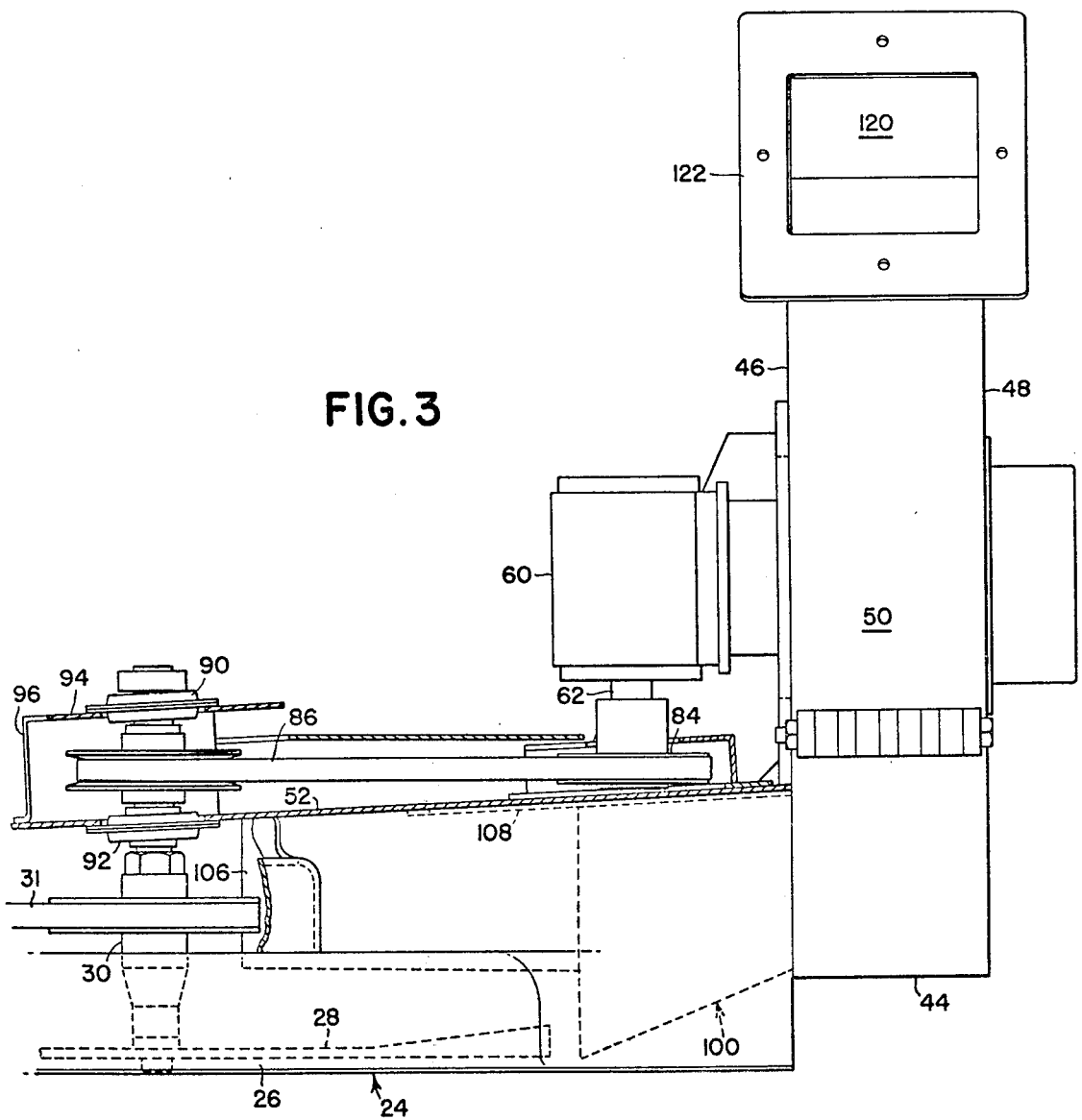
FIG. 3 is a rear elevational view of the mulcher and mower housing combination shown in FIG. 2 but showing the outer side plate of the mulcher housing installed.

A plurality of cutterbars 110 arranged in three sets of five cutterbars each are mounted on the intermediate wall 50 of the housing 44, the first set of cutterbars 110 extending vertically into the housing and being located just to the right of the inlet opening 98 as viewed in FIG. 2, the second set extending horizontally into the housing and being located approximately 90° counterclockwise from the first set and the third set of cutterbars extending horizontally into the housing and being located just above and behind the inlet opening 98. The cutterbars 110 of each set are respectively spaced so that outer sharpened end portions 112 located along the leading edges of both ends of each of the mulcher-impeller blades 70 will pass between adjacent ones of the cutterbars 110. Secured to the trailing edges of the opposite ends of each of the blades 70 at locations radially inwardly from the sharpened ends 112 are impeller fins 114 including axially inclined portions 116, the fins 114 being mounted on opposite sides of adjacent blades 70 such that the outwardly inclined portions 116 of adjacent blades project away from each other. The impeller fins 114 cooperate with the blades 70 to impel material from the inlet opening 98 to an outlet opening 118 located in the intermediate wall 50 at an upper rear location which lies in a path extending tangentially to the path traced by the sharpened ends 112 of the blades 70. The outlet opening 118 is located at an inner end of an upwardly and rearwardly inclined, tubular discharge duct 120 which has an upright mounting flange 122 integral with its distal end. A material transfer duct 124 is shaped complementary to the duct 120 and includes a mounting flange 126, at its forward end, which is fixed to the mounting flange 122 by means of suitable fasteners. The duct 124 extends into a central portion of a conically shaped container top 128. The container top closes the upper end of a cylindrical container 130. A flexible bag 132, which may be made of a thin plastic material, is placed in the container 130 and has its upper end held between the container top 128 and the container 130. For the purpose of permitting the flow of air therethrough so as to not impede the flow of material from the housing 144 to the bag 132, the top 128 is provided with a plurality of apertures 134.

The container 130 is supported from the tractor main frame 10 through means of a laterally extending arm or support 136 having its inner end bolted to the frame 10 and having its outer end shaped so as to define a container cradle 138.

The operation of the device is as follows. As the tractor travels over a lawn to be mowed, the mower blades 28 will sever the grass and will cause the latter to be impelled along the top surface of the mower deck through the discharge chute. As the material nears the discharge opening 40 it will be influenced by the baffle or deflector member 100 such that it will be guided into the inlet opening 98 of the housing 44. As the material enters the housing 44 it will be moved counterclockwise by being engaged by the blades 70 and impeller fins 114 and by the suction imparted thereto due to the movement of air caused by the blades and impeller fins. As the sharpened ends 112 of the blade 70 pass between the cutterbars 110, grass clippings located at the outer portion of the housing 44 will be mulched. Some of the clippings may be cut both by the coaction of the blades with the first set of cutterbars which are located just forwardly of the inlet opening 98 as viewed in FIG. 2 and by the second set of cutterbars before proceeding on through the outlet opening 118. While most of the material in the outer portion of the housing 44 will be impelled through the outlet opening 118, some of this material together with any material which might be disposed more centrally in the housing will be carried towards and through the third set of cutterbars which are located just rearwardly of the inlet opening 98.

Tests have shown that a mower and mulcher-bagger attachment combination of the type disclosed is capable of placing sixty pounds or more of a combination of grass clippings and dry leaves into an average sized container such as those normally used by homeowners to hold trash and the like.

I claim:

1. In a power lawn mower and mulcher-bagger, the combination comprising: an open-bottom mower blade housing including a top and an outer peripheral skirt depending from the top; rotary mower blade means located in the mower blade housing and fixed to a spindle means which is rotatably mounted in the housing top; said mower housing having a discharge chute defined by a top and front and rear vertical walls which cooperate to define a discharge opening adjacent one side of the housing; said mower blade means being operative to sever a crop from the ground, and for cooperating with said housing to lift light material from the ground and to impel the severed crop and lifted material through said discharge opening; a substantially cylindrical mulcher housing mounted on the mower housing in the vicinity of said discharge opening; said mulcher housing having an inlet opening in a lower location thereof in direct material receiving relationship to said discharge opening; baffle means extending into said discharge opening from said mulcher housing for guiding material into said inlet opening and for preventing material from recirculating in said mower blade housing; said baffle means including front and rear portions disposed against said front and rear walls of the discharge chute and a bottom portion connecting the front and rear portions; said mulcher housing being disposed such that its longitudinal axis extends substantially horizontally; a rotatable shaft means extending axially through and supported by the housing; rotor means including mulcher-impeller blade means secured to said shaft means for rotation therewith and having end portion means disposed so as to trace a path spaced radially outwardly from said shaft means; cutterbar means mounted on the housing and having end portions projecting thereinside at locations so located relative to said end portion means of the blade means that the latter pass closely adjacent said cutterbar means while rotating; an outlet opening located at an upper location in the housing and extending substantially tangentially to the path traced by said end portions, said mulcher-impeller blades being configured so as to impel material received from the mower housing past said cutterbar means and through said outlet opening; material receiving container means mounted on the rear end of said lawn mower and material-conveying conduit means interconnecting said outlet opening of said mulcher housing with said container.

2. The power lawn mower and mulcher defined in claim 1 wherein said mulcher-impeller blade means includes a plurality of axially spaced flat blades disposed diametrically in said mulcher housing, each of said flat blades having opposite radially outer, sharpened leading edge portions, as considered in the normal direction of rotation of the blades; and each blade having an impeller fin fixed thereto at a location radially inwardly from each sharpened leading edge portion; and said impeller fins including portions angled from said blades in an axial direction in the housing.

3. In combination with a tractor supporting a rotary mower of the type including an open bottom mower housing having mower blade means disposed therein and adapted to sever material and to impel the severed material along a discharge path defined by a top wall and front and rear vertical walls of the housing and extending in general tangential relationship to the cutting blade means, said path terminating at a discharge opening in the side of the mower housing, a mulcher-bagger attachment comprising: a housing means secured to the mower housing and including baffle means inserted in said discharge opening comprising front and rear portions disposed against said front and rear vertical walls and interconnected by a bottom portion inclined upwardly away from the mower housing; said housing means further including a generally cylindrical portion having transversely spaced end walls and a generally circular, tubular immediate wall joining said end walls; a generally horizontal and transversely extending rotatable drive shaft means extending axially through and supported by said end walls of said housing means; said cylindrical portion having an inlet opening in a lower area thereof and said baffle means leading to said inlet for guiding severed material to the exterior of said housing means; said cylindrical portion having an outlet opening in an upper area of said intermediate wall; rotor means including a mulcher-impeller blade means being mounted on said drive shaft means for rotation therewith for carrying material from said inlet opening to said outlet opening; cutterbar means fixed to said housing means and positioned to cooperate with said mulcher-impeller blade means for recutting material as it is carried by the blade means between said inlet and outlet openings; container means supported on the tractor and including conduit means leading from said outlet opening so as to receive mulched material discharged from said housing means; and drive means connected to said drive shaft means for rotating the latter.

* * * * *